Figure 1:
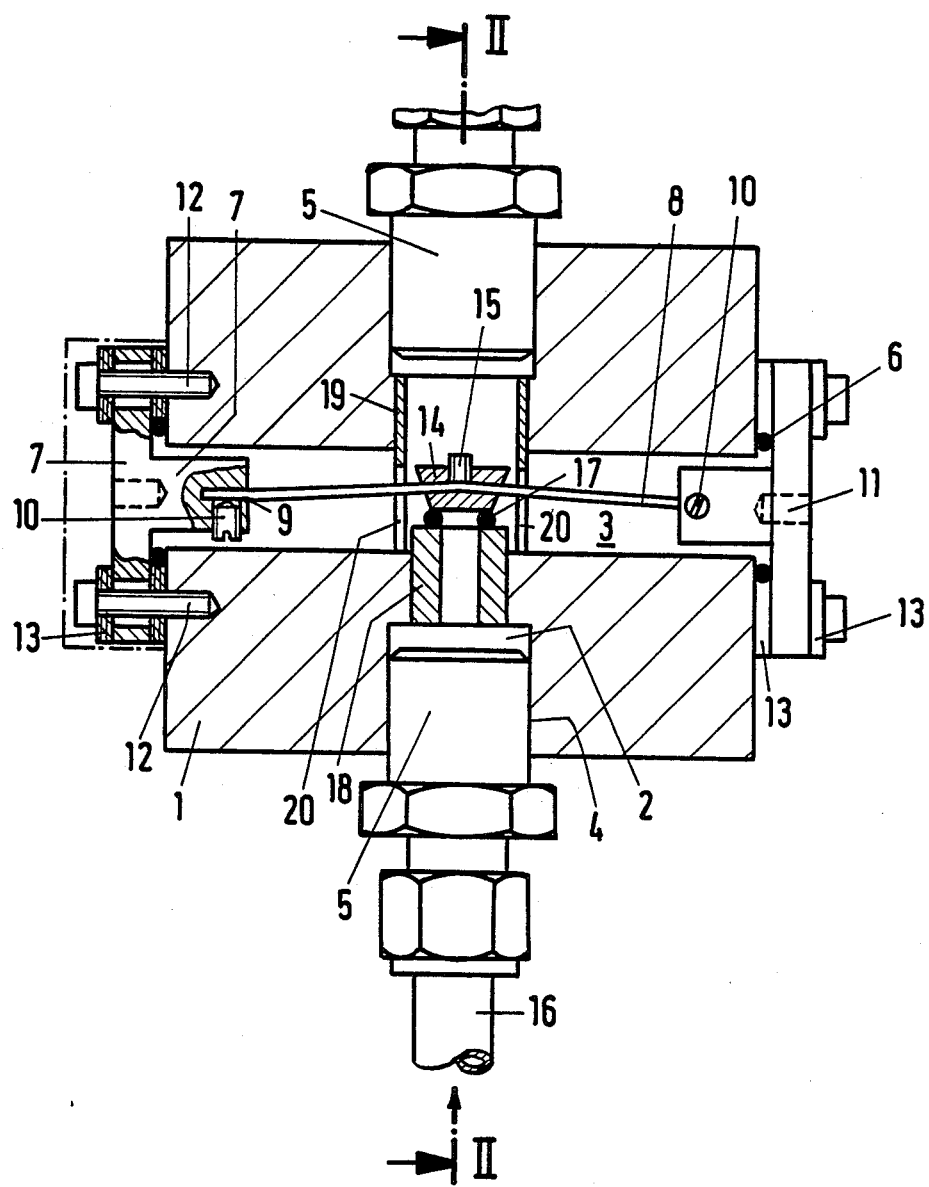

United States Patent [19]

Muntwyler

[11] Patent Number: 4,809,947

[45] Date of Patent: Mar. 7, 1989

[54] FLOW REGULATION VALVE

[75] Inventor: Peter Muntwyler, Wohlen, Switzerland

[73] Assignee: Plasma-Invent AG, Zug, Switzerland

[21] Appl. No.: 83,060

[22] Filed: Jul. 28, 1987

[30] Foreign Application Priority Data

Aug. 7, 1986 [CH] Switzerland ............. 03168

[51] Int. Cl.⁴ .................................. F16K 31/02
[52] U.S. Cl. .................... 251/11; 236/68 R; 236/93 R; 236/101 E
[58] Field of Search .............. 251/11, 129.01; 236/101 E, 68 R, 93 R

[56] References Cited

U.S. PATENT DOCUMENTS

| 669,474 | 3/1901 | Broad | 251/11 X |
|---|---|---|---|
| 1,643,451 | 9/1927 | Hickman | 251/11 X |
| 1,681,911 | 8/1928 | Spencer | 251/11 X |
| 1,814,045 | 7/1931 | Kay | 251/11 X |
| 2,037,684 | 4/1936 | Hegwein | 236/101 E X |
| 2,232,934 | 2/1941 | Baak | 251/11 X |
| 3,450,344 | 6/1969 | O'Brian | 236/93 R X |
| 3,745,984 | 7/1973 | King | 251/11 X |
| 3,790,077 | 2/1974 | Wisyanski et al. | 236/101 E |
| 3,856,259 | 12/1974 | Doherty, Jr. | 251/11 |

Primary Examiner—Arnold Rosenthal
Attorney, Agent, or Firm—Kenyon & Kenyon

[57] ABSTRACT

The regulating valve has a heat responsive extension element which is prestressed and which extends crosswise of the gas line. The extension element biases the valve body into sealing engagement with the valve seat to maintain the valve in a normally closed position. Due to the slight deflection of the extension element, the thermal length variation of the extension element is transformed into an approximately 100-fold stroke of the valve body relative to the valve seat. The control accuracy of the valve is considerably increased.

14 Claims, 2 Drawing Sheets

FLOW REGULATION VALVE

This invention relates to a flow regulating valve. More particularly, this invention relates to a flow regulating valve for mass streams of gaseous media. Still more particularly, this invention relates to a flow regulating valve for plasma spraying equipment.

As is known, various types of flow regulating valves have been used for controlling a mass stream of a gaseous medium, for example in plasma spraying equipment. For example, a pamphlet entitled "Mass Flow Controllers" of Tylan Corporation of Carson, Calif. 90745 describes a flow regulating valve which is adjustable by means of the thermal expansion of an extension element. In this case, a ball which is used as a valve body is fastened to a thin tube which functions as the extension element. In addition, a heat transfer medium and a resistant heating element are provided inside the thin tube. In use, after a voltage has been applied, current flows through the heating element and causes a temperature rise and a concurrent elongation of the thin tube. In this case, the total stroke of the valve body is only a few thousandths of a millimeter. Thus, in order to ensure the necessary accuracy of control, such a flow regulating valve requires very precisely machined valve seats. For this reason, the valve seats are made, for example, of sapphire. Further, since heating of the tube causes only a lengthening of the tube, the construction of the valve allows only control from a "fully opened" rest position to a position which permits smaller flow cross sections This, however, is often not desired.

Accordingly, it is an object of the invention to increase the stroke range of flow regulating valves operating on the principle of thermal expansion.

It is an object of the invention to provide a high accuracy of control within a flow regulating valve which is adjustable by means of a thermal expansion of an extension element.

It is another object of the invention to provide a flow regulating valve which is in a normally closed state of "rest".

Briefly, the invention provides a flow regulating valve which comprises a valve housing having a gas line for a flow of gas therethrough and a bore extending perpendicularly of and through the gas line, a valve seat disposed in and about the gas line and a valve body seated on the valve seat. In addition, the valve includes an extension element which extends within the bore and across the gas line while being deflected within the gas line under a prestress for biasing the valve body into sealing relation with the valve seat.

The valve housing is constructed so that the bore is hermatically closed to the outside and communicates with the gas line.

The extension element is heat expandable and is secured at opposite ends in the bore in a clamped manner while being deflected, for example with a "kink" which is located in the region of the gas flow. In this respect, the deflection and bend of the extension element from a straight line of connection between the clamped ends brings about a "transmission ratio" of the valve stroke to the elongation of the prestressed extension element of about 100 to 1. At room temperature, the angle by which the extension element is deflected relative to the straight line between the clamped ends is, for example, about three degrees.

The regulating valve is also provided with a means for heating the extension element in order to increase the deflection of the element and thereby cause moving of the valve body from the valve seat, for example, from the closed rest position to an opened position.

After the extension element has been heated, the displacement of the valve body from the valve seat occurs under the pressure of the gas flow in the gas line. On the other hand, for a return of the valve body to the valve seat, the prestress of the extension element is utilized.

Appropriately after movement of the valve body from the valve seat, the gas flow may be guided through a sleeve within the housing and concentrically about the valve body in the region of the bore.

Advantageously, the extension element is arranged and deflected so that the "kink" is displaced in a direction away from the valve seat from a direct straight line of connection of the clamped ends of the element. Further, the valve body is disposed to set down on the valve seat in a direction opposite to the direction of the gas flow.

The extension element may be made as a thin tube. Heating is simplest if the tube is traversed by an electric current. For this, expediently, the extension element is electrically insulated from the valve housing and is connected to a current source. Alternatively, the extension element may be heated by means of a temperature-controlled gas stream flowing in the interior thereof.

Figure 2:
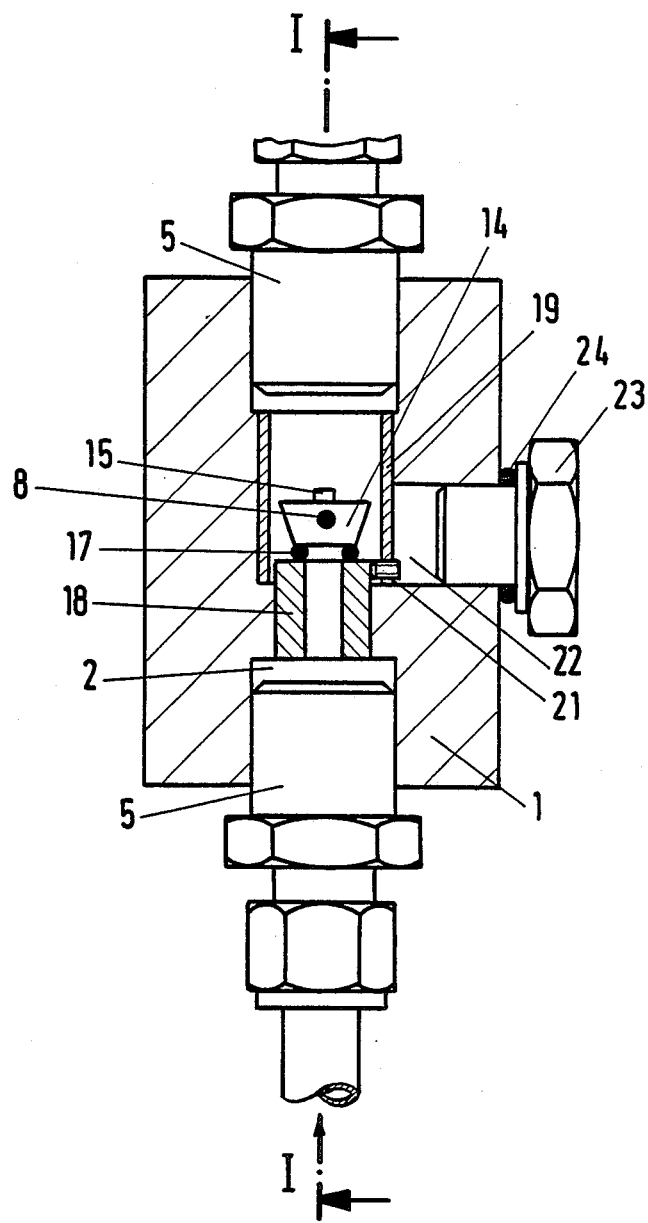

These and other objects and advantages of the invention will become more apparent from the following detailed description taken in conjunction with the accompanying drawings wherein:

FIG. 1 illustrates a view taken on line I—I of a flow regulating valve constructed in accordance with the invention; and FIG. 2 illustrates a view taken on line II—II of FIG. 1.

Referring to FIG. 1, the flow regulating valve includes a housing 1 formed, for example of a light metal block and traversed by a first gas line 2 for a flow of gas therethrough and a bore 3 extending perpendicularly of and through the gas line 2. The opposite ends of the gas line 2 are each provided with screw threads 4 into which connecting pieces 5 are threaded in order to integrate the housing 1 into a gas flow path of a gas whose mass flow is to be regulated. As indicated, the flow direction of the gas is assumed to be upward as indicated by the arrows.

The cross bore 3 is hermetically sealed from the outside by covers 7 and O-rings 6 disposed between the respective covers 7 and the housing 1.

A heat expandable extension element 8 extends through the cross bore 3 and is clamped at opposite ends in covers 7 which are secured to the housing 1. As shown to the left in FIG. 1, each cover 7 has a blind bore 9 which receives an end of the extension element 8. In addition, a threaded pin 10 is threaded into the bore 9 in order to fix the end of the extension element 8 therein. Of note, in FIG. 1, the right-hand pin 10 is shown in the correct angular position relative to the other parts of the valve whereas the pin on the left-hand side is shown in an angularly rotated 90° position for purposes of clarity.

The extension element 8 may be in the form of a tube or tubule of metal having outside and inside diameters of, for example, 1 and 0.6 millimeters, respectively.

The valve also has a means for heating the extension element 8. To this end, each cover 7 is made of metal and is provided with a threaded bore 11 on the exterior for connection of a current source (not shown) which serves as a heating source for the temperature control of the extension element 8. Each cover 7 is also fastened to the housing 1 by means of bolts 12 and is electrically insulated from the housing 1 via the O-rings 6 as well as by insulation bushings 13 made, for example, of a glass fiber reinforced polysulfone. If necessary, the covers 7 may also be covered by a plastic hood which is indicated in broken lines on the left-side of FIG. 1.

As illustrated, the connecting piece 5 at the lower end of the housing 1 is connected to a gas line 16 so as to receive and deliver a flow of gas into the bore 2. In addition, a bushing 17 is threaded in to the valve housing 1 on the entrance side of the gas flow to conduct the gas flow therethrough. A valve seat 17 which consists, for example, of an O-ring of rubber is mounted on the bushing 18 and provides a seat for a valve body 14.

The valve body 14 controls the mass flow through the gas lines 16 and in a rest position is "normally closed". The valve body 14 is threaded onto the extension element 8 and is secured therein by means of a threaded pin 15. In addition, the mounting of the valve body 14 on the valve seat 17 is such that the extension element is deflected from a plane passing through the clamped points of connection of the extension element 8 in the blind bores 9 of the covers 7. In this sense, the deflection of the extension element 8 forms a "kink" in the element 8. This "kink" opens in an angle of 175° against the direction of gas flow. As indicated in FIGS. 1 and 2, the extension element 8 bridges over the valve seat 17 and bushing 18 which are in the gas flow bore 2.

The extension element 8 is further deflected under a prestress for biasing the valve body 14 into sealing relation with the valve seat 17. To this end, the extension element 8 can initially be mounted in the covers 7 to bridge across the bore 2 in an undeflected manner. Thereafter, the bushing 18 with the valve seat 17 thereon can be threaded further into the housing 1 so as to deflect the extension element 8 the appropriate amount. For example, for the given dimensions of a tubular extension element 8 and a gas pressure of a maximum of three bars, the tension of the prestress at the extension element 8 may be about 50N.

Referring to FIGS. 1 and 2, the part of the bushing 18 extending into the cross bore 3 as well as the valve seat 17 and the valve body 14 are surrounded in spaced relation by a sleeve 19 which is inserted into the "gas exit side" part of the bore. This sleeve 19 is concentric about the valve body 14 and is fixed in place by a threaded pin 21 (see FIG. 2) which passes into the bushing 18. In addition, slits 20 are provided in the sleeve 19 for the passage and movement of the extension element 8 in and counter to the direction of gas flow. The sleeve 19 serves to guide the gas flow in the longitudinal direction of the gas line bore 2 while preventing spreading of the gas into the cross bore 3 to the extent possible.

Referring to FIG. 2, the housing 1 is provided with assembly bores 22 perpendicular to the bores 2, 3 at the level of the clamping points of the extension element 8 and in the region of the bushing 18. Each of the three assembly bores 22 is closed off from the outside by a threaded plug 23 and is sealed by means of an O-ring 24 between the plug 23 and the housing 1.

The regulating valve is constructed so as to be closed at room temperature. That is, there is to be no gas flow at room temperature through the valve.

With the above stated dimensions and initial stresses, the closing force of the valve is about 4N. The valve can be opened upon thermal expansion of the extension element 8. In this respect, a relatively small length variation of the extension element 8 due to heating brings about an approximately 100-fold stroke of the valve body 14.

The thermal expansion of the extension element 8 is provided by generation of heat when an electrical current flows through the element 8. The heating current can be influenced directly by an output signal of a controller (not shown) in which a set desired value and an actual value for the gas stream produced by a commercial gas flowmeter are compared with one another as voltages.

Alternatively, instead of using a regulated operation, it is possible to operate the valve in a "controlled" manner. That is, it is possible to allow a constant current which is dependent on the desired gas flow through the extension element 8 without an actual value being measured and fed to a controller. In this mode of operation, an equilibrium between the temperature rise (which is constant for a certain gas flow) and the cooling of the extension element 8 due to the flowing gas stream establishes itself.

The flow regulating valve operates on the principle of thermal expansion in which the stroke range is substantially increased as compared with those of previously known valves. Hence, a high accuracy of control, i.e. a small deviation of the actual value from the desired value, can be achieved. For example, this deviation may be, at most, 0.2% of the maximum value.

What is claimed is:

1. A flow regulating valve comprising
   a valve housing having a gas line for a flow of gas therethrough and a bore extending perpendicularly of an through said gas line;
   a valve seat disposed in and about said gas line;
   a valve body seated on said valve seat;
   a sleeve within said housing concentrically about said valve body; and
   an extension element extending within said bore and across said gas line and being deflected within said gas line under a prestress for biasing and valve body into sealing relation with said valve seat.

2. A flow regulating valve as set forth in claim 1 which further comprises means for heating said element to increase the deflection of said element for moving said valve body from said valve seat.

3. A flow regulating valve as set forth in claim 2 wherein said means includes an electrical current source connected to said element and said element is electrically conductive.

4. A flow regulatory valve as set forth in claim 1 wherein said extension element is clamped at opposite ends in said bore and is deflected away from said valve seat.

5. A flow regulatory valve as set forth in claim 1 wherein said valve body is disposed to seat on said valve seat in opposition to a flow of gas through said gas line.

6. A flow regulating valve comprising
   a valve housing having a gas line for a flow of gas therethrough and a cross bore extending perpendicularly of said gas line;

a valve seat disposed in and about said gas line;

a valve body seated on said valve seat to close said gas line to a flow of gas therethrough; and a heat expandable extension element secured at opposite ends in said bore and extending through said gas line, said element having a intermediate section secured to said valve body and deflected in a direction away from said valve seat to bias said valve body under a prestress into sealing relation with said valve seat.

7. A flow regulating valve as set forth in claim 6 wherein said element is electrically conductive.

8. A flow regulating valve as set forth in claim 6 wherein said element is a tube.

9. A flow regulating valve as set forth in claim 6 wherein said element is threaded through said valve body.

10. A flow regulating valve as set forth in claim 6 which further comprises means for heating said element to increase the deflection of said element for moving said valve body from said valve seat.

11. A flow regulating valve as set forth in claim 10 wherein said means includes an electrical current source connected to said element and said element is electrically conductive.

12. A flow regulating valve comprising a valve housing a gas line for a flow of gas therethrough and a bore extending perpendicularly of and through said gas line;

a valve seat disposed in and about said gas line;

a valve body seated on said valve seat; and an extension element within said bore and across said gas line, said element being clamped at opposite ends and being deflected within said gas line under a prestress for biasing said valve body into sealing relation with said valve seat, said element being thermally expandable to move said valve body from said valve seat over a controlled stroke range.

13. A flow regulating valve as set forth in claim 12 which further comprises means for heating said element to increase the deflection of said element for moving said valve body from said valve seat.

14. A flow regulating valve as set forth in claim 13 wherein said means includes an electrical current source connected to said element and said element is electrically conductive.

* * * * *

UNITED STATES PATENT AND TRADEMARK OFFICE
CERTIFICATE OF CORRECTION

PATENT NO.  : 4,809,947

DATED       : March 7, 1989

INVENTOR(S) : PETER MUNTWYLER

It is certified that error appears in the above-identified patent and that said Letters Patent is hereby corrected as shown below:

```
Column 4, line 40 "an" should be -and-
Column 6, line 4 "housing a" should be -housing having a-
```

Signed and Sealed this

Sixteenth Day of July, 1991

Attest:

Attesting Officer

HARRY F. MANBECK, JR.

Commissioner of Patents and Trademarks